United States Patent
Ludtke et al.

(10) Patent No.: US 7,075,557 B2
(45) Date of Patent: Jul. 11, 2006

(54) METHOD OF AND APPARATUS FOR HANDLING HIGH BANDWIDTH ON-SCREEN-DISPLAY GRAPHICS DATA OVER A DISTRIBUTED IEEE 1394 NETWORK UTILIZING AN ISOCHRONOUS DATA TRANSMISSION FORMAT

(75) Inventors: Harold Aaron Ludtke, San Jose, CA (US); Scott D. Smyers, San Jose, CA (US); Mark Kenneth Eyer, San Diego, CA (US)

(73) Assignees: Sony Corporation, Tokyo (JP); Sony Electronics INC, Park Ridge, NJ (US)

( * ) Notice: Subject to any disclaimer, the term of this patent is extended or adjusted under 35 U.S.C. 154(b) by 193 days.

(21) Appl. No.: 10/430,570

(22) Filed: May 5, 2003

(65) Prior Publication Data
US 2003/0210252 A1    Nov. 13, 2003

Related U.S. Application Data

(63) Continuation of application No. 09/251,586, filed on Feb. 17, 1999, now Pat. No. 6,593,937.

(60) Provisional application No. 60/089,798, filed on Jun. 18, 1998.

(51) Int. Cl.
  *G06F 13/00*  (2006.01)
  *G09G 5/36*   (2006.01)
  *G06T 9/00*   (2006.01)
  *H04N 5/445*  (2006.01)

(52) U.S. Cl. .............. 345/629; 345/345; 345/555; 345/556; 348/563; 348/569; 382/232; 382/233; 370/379; 370/475

(58) Field of Classification Search ........ 345/629–630, 345/716, 534, 538, 543, 564, 555, 565; 348/563–565, 348/569, 552; 382/232–233; 715/716; 370/379, 370/395, 473–475, 498, 535
See application file for complete search history.

(56) References Cited

U.S. PATENT DOCUMENTS

| | | | |
|---|---|---|---|
| 4,290,064 A | 9/1981 | Traster | 340/723 |
| 4,800,376 A | 1/1989 | Suga et al. | 340/721 |
| 5,003,496 A | 3/1991 | Hunt, Jr. et al. | 364/521 |
| 5,255,360 A | 10/1993 | Peaslee et al. | 395/162 |
| 5,262,965 A | 11/1993 | Putnam et al. | 395/101 |
| 5,343,250 A | 8/1994 | Iwamura | 348/564 |
| 5,436,641 A | 7/1995 | Hoang et al. | 345/197 |
| 5,444,709 A | 8/1995 | Riddle | 370/94.1 |
| 5,477,262 A | 12/1995 | Bsnker et al. | 348/7 |
| 5,581,796 A | 12/1996 | Koga et al. | 395/133 |
| 5,596,581 A | 1/1997 | Saeijs et al. | 370/394 |
| 5,610,665 A | 3/1997 | Berman | 348/564 |
| 5,640,392 A | 6/1997 | Hayashi | 370/395 |
| 5,642,498 A | 6/1997 | Kutner | 395/509 |
| 5,682,249 A | 10/1997 | Harrington et al. | 358/433 |
| 5,687,316 A * | 11/1997 | Graziano et al. | 709/250 |
| 5,692,211 A | 11/1997 | Gulick et al. | 395/800 |
| 5,708,527 A | 1/1998 | Adamson et al. | 359/451 |
| 5,729,704 A | 3/1998 | Stone et al. | 395/346 |
| 5,764,277 A | 6/1998 | Loui et al. | 348/14 |
| 5,774,467 A | 6/1998 | Herrera Van Der Nood et al. | 370/428 |
| 5,778,054 A | 7/1998 | Kimura et al. | 379/93.23 |
| 5,845,152 A | 12/1998 | Anderson et al. | 395/872 |
| 5,870,523 A | 2/1999 | Kikuchi et al. | 386/95 |
| 5,880,739 A | 3/1999 | Collins | 345/433 |
| 5,880,777 A | 3/1999 | Savoye et al. | 348/217 |
| 5,883,634 A | 3/1999 | Narayanaswami | 345/434 |
| 5,886,995 A | 3/1999 | Arsenault et al. | 370/477 |
| 5,894,320 A | 4/1999 | Vancelette | 348/7 |
| 5,909,244 A | 6/1999 | Waxman et al. | 348/222 |
| 5,926,153 A | 7/1999 | Ohishi et al. | 345/1 |
| 5,948,136 A | 9/1999 | Smyers | 71/107 |
| 5,966,136 A | 10/1999 | Kurtz et al. | 345/434 |
| 5,983,190 A | 11/1999 | Trower, II et al. | 704/276 |
| 5,983,301 A | 11/1999 | Baker et al. | 710/113 |
| 5,986,622 A | 11/1999 | Ong | 345/1 |
| 6,002,401 A | 12/1999 | Baker | 345/349 |
| 6,003,065 A | 12/1999 | Yan et al. | 709/201 |

| | | | |
|---|---|---|---|
| 6,005,574 A | 12/1999 | Herrod | 345/344 |
| 6,018,816 A * | 1/2000 | Tateyama | 714/746 |
| 6,031,479 A | 2/2000 | Slizynski et al. | 341/155 |
| 6,032,197 A | 2/2000 | Birdwell et al. | 709/247 |
| 6,069,606 A | 5/2000 | Sciammarella et al. | 345/127 |
| 6,081,852 A * | 6/2000 | Baker | 710/24 |
| 6,084,553 A | 7/2000 | Walls et al. | 345/1 |
| 6,111,589 A | 8/2000 | De Haan | 345/473 |
| 6,115,392 A | 9/2000 | Nomura | 370/466 |
| 6,121,981 A | 9/2000 | Trower, II et al. | 345/73 |
| 6,150,953 A | 11/2000 | Tanaka et al. | 340/825.37 |
| 6,167,471 A | 12/2000 | Liu et al. | 710/62 |
| 6,175,386 B1 | 1/2001 | Van De Schaar-Mitrea et al. | 348/563 |
| 6,208,319 B1 | 3/2001 | Nishida | 345/1 |
| 6,243,772 B1 | 6/2001 | Ghori et al. | 710/68 |
| 6,317,885 B1 | 11/2001 | Fries | 725/109 |
| 6,363,428 B1 | 3/2002 | Chou et al. | 709/232 |
| 6,377,276 B1 | 4/2002 | Ludtke | 345/620 |
| 6,501,441 B1 * | 12/2002 | Ludtke et al. | 345/1.1 |
| 6,593,937 B1 * | 7/2003 | Smyers et al. | 345/629 |
| 2002/0181787 A1 * | 12/2002 | Ito et al. | 382/232 |

FOREIGN PATENT DOCUMENTS

| | | |
|---|---|---|
| EP | 0 476 533 A2 | 3/1992 |
| EP | 0 543 414 A2 | 5/1993 |
| EP | 0 658 010 A1 | 6/1995 |
| EP | 0 835 029 A2 | 4/1998 |
| EP | 0 840 512 A2 | 5/1998 |
| WO | WO 97/49057 A2 | 12/1997 |
| WO | WO 98/25402 | 6/1998 |
| WO | WO 99/66720 * | 12/1999 |

OTHER PUBLICATIONS

Teener, M., "A Bus on a Diet-The Serial Alternative; An Introduction to the P1394 High Performance Serial Bus," Apple Computer, Inc., Santa Clara, Document No. XP 000340753, IEEE, pp. 316-321, 1992.

Bloks, R.H.J., "The IEEE-1394 High Speed Serial Bus," Document No. XP 000627671, Philips Journal of Research, pp. 209-216, vol. 50, No. 1/2, 1996.

Meirsman, D., "AV/C Audio Control Definition; Draft Proposal For Control of Audio Functionality," Ver. 0.6, Mar. 8, 1998.

Poynton, C., "YUV and Luminance Considered Harmful: A Plea for Precise Terminology in Video, " May 2, 1998.

"HDND 1394 Interface Specification [To Be Incorporated into OCI-C1, Consumer Device Interface Specification]," working paper draft specification ver.2.2, Cable Television Laboratories, Inc. 1998.

Azhar, S., "Draft EIA-775, DTV 1394 Interface Specification," CEMA, Nov. 30, 1998.

"R4.1 DTV Digital Interference Standard: DRAFT EIA754," draft 0.30, CEMA/EIA R4.1 Application Working Group, Apr. 8, 1998.

"OSD Bitmab Transport over the DTV 1394 Interface; Proposal to CEMA R4.8," Ver. 0.90, Mitsubishi Electric America, Inc., Aug. 26, 1998.

Patent Abstracts of Japan Publications No. 05094162.

IEEE, "1394-1995 Standard for a High Performance Serial Bus," 1995, USA.

Sony et al., "The HAVi Architecture: Specification of the Home Audio/Video Interoperability (HAVi) Architecture" Draft Version 0.8n13, Sep. 16, 1998.

IEC, "61883-1998 Standard for Digital Interface for Consumer Audio/Video Equipment," Parts 1-5, Edition 1.0, Feb. 1998.

A. J. Kunzman et al., "1394 High Performance Serial Bus: The Digital Interface for ATV," IEEE Transactions on Consumer Electronics, vol. 41, No.3, Aug. 1995, pp. 893-900, USA.

* cited by examiner

*Primary Examiner*—Richard Hjerpe
*Assistant Examiner*—Wesner Sajous
(74) *Attorney, Agent, or Firm*—Haverstock & Owens LLP

(57) ABSTRACT

On-screen-display graphics data is transmitted from a source device to a display device over an IEEE 1394-1995 serial bus network utilizing an isochronous data format. The on-screen-display graphics data is generated by the source device and transmitted to a display device, as a stream of isochronous data, separate from video data. Each packet of isochronous data within the stream of on-screen-display graphics data includes an address value corresponding to a memory address within the display device forming a buffer. When received by the display device the on-screen-display graphics data is loaded into the appropriate memory locations within the buffer corresponding to the address values. At the display device, an embedded stream processor is utilized to strip the header information from each packet and determine the appropriate memory location that the data is to be stored. A trigger packet is sent at the end of the data stream for a screen of on-screen-display graphics. The trigger packet includes a presentation time value corresponding to a display time for the screen of on-screen-display graphics. When the trigger packet is received, the display device transfers the data stored in the buffer to a VRAM circuit for display at the specified presentation time. The on-screen-display graphics data can be overlaid on video data for display and also displayed separately. Differential encoding is used when transferring frames of data wherein only a portion of data changes from the previous frame.

44 Claims, 10 Drawing Sheets

METHOD OF AND APPARATUS FOR HANDLING HIGH BANDWIDTH ON-SCREEN-DISPLAY GRAPHICS DATA OVER A DISTRIBUTED IEEE 1394 NETWORK UTILIZING AN ISOCHRONOUS DATA TRANSMISSION FORMAT

RELATED APPLICATIONS

This application is a continuation of U.S. patent application Ser. No. 09/251,586 filed on Feb. 17, 1999 now U.S. Pat. No. 6,593,937 which claims priority under 35 U.S.C. § 119(e) of U.S. provisional application Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK." The provisional application Ser. No. 60/089,798 filed on Jun. 18, 1998 and entitled "A METHOD FOR HANDLING HIGH BANDWIDTH ON-SCREEN-DISPLAY (OSD) OVER A DISTRIBUTED 1394 NETWORK" is also hereby incorporated by reference.

FIELD OF THE INVENTION

The present invention relates to the field of displaying on-screen-display graphics data on a display device. More particularly, the present invention relates to the field of displaying on-screen-display graphics data provided from a source device on a display device.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard provides a high-speed serial bus for interconnecting digital devices thereby providing a universal I/O connection. The IEEE 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A block diagram of a conventional home audio/video network including a television and a video cassette recorder (VCR) is illustrated in FIG. 2. The television 20 is coupled to the VCR 40. Video data and associated data are sent between the VCR 40 and the television 20 in a known manner.

Relevant internal components of the television 20 and the VCR 40 are also illustrated in FIG. 2. The television 20 includes an interface 32 which sends and receives audio and video signals to and from the VCR 40. The interface 32 is coupled to an audio/video switch 26 for directing audio/video signals to and from the VCR 40. A cable/antenna interface circuit 30 is coupled to receive input signals from a coaxial cable or an antenna and to pass those signals through a tuner 28 to the audio/video switch 26. The audio/video switch 26 is coupled to a video random access memory (VRAM) circuit 24 for providing the video signals from the cable/antenna interface 30 or the VCR 40 to the display 22.

The VCR 40 includes a video source 46, such as a video tape which is being played by the VCR 40 or a television input. The VCR 40 also includes a graphics source 48 which generates on-screen-display graphics to be displayed by the television 20 when the VCR 40 is sending data to be displayed by the television 20. Such on-screen-display graphics include words or symbols representing commands being executed by the VCR 40, such as PLAY, STOP, REWIND, FAST-FORWARD, PAUSE and RECORD. The on-screen-display graphics generated by the graphics source 48 typically also include a menu or menus displayed on the television 20 for the user which allow the user to program the VCR 40. On-screen-display graphics generated by the graphics source 48 are provided to a mixer circuit 44. The mixer circuit 44 also receives video data from the video source 46. The mixer circuit 44 then combines the on-screen-display graphics from the graphics source 48 and the video data from the video source 46 into a video output which is transmitted through the interface circuit 42 to the television 20. The video output from the VCR 40 is then processed by the television 20 and shown on the display 22. The mixer circuit 44 will, as appropriate, either overlay the on-screen-display graphics onto the video data to form the video output or cause the video output to include only on-screen-display graphics from the graphics source 48 or video data from the video source 46.

In an audio/video network including a digital television and a digital VCR coupled together by an IEEE 1394-1995 serial bus network, the video data from the VCR is typically transmitted in a digital format such as MPEG. The VCR is not typically responsible for encoding the video data in an MPEG format, but will record and transmit data previously encoded in a MPEG format by another source. In order for the VCR to have the ability to combine on-screen-display graphics with the video data, as described above, the VCR would have to include an MPEG encoder and have the ability to encode the on-screen-display graphics into an MPEG format and then combine the streams of data into a video output stream of data. Due to the cost of MPEG encoders, such a requirement is cost prohibitive in competitive consumer VCRs.

A home audio/video interoperability (HAVi) architecture is defined by "The HAVi Architecture: Specification of the Home Audio/Video Interoperability (HAVi) Architecture," draft version 0.8n13, Sep. 16, 1998. The HAVi architecture is to be implemented on consumer electronics devices and computing devices. The HAVi architecture provides a set of services which facilitate interoperability and the development of distributed applications on home networks. The HAVi architecture is designed for digital devices coupled together within an IEEE 1394-1995 serial bus network.

The HAVi architecture defines two on-screen-display graphics models, referred to as level 1 and level 2. The level 1 on-screen-display graphics model is a descriptive model in which the target device provides, through a series of commands, data structures which describe the intended on-screen-display graphics. Using a graphics library applications programming interface, the display device uploads this information and constructs the display graphics, which may or may not look as the target device intended. The level 2 on-screen-display graphics model defines a runtime execution environment, where the display device uploads executable code which runs on the display device itself. This executable code is then used to generate the on-screen-display graphics using facilities provided by the display device.

Using the HAVi architecture, a device such as the digital VCR described above, is not required to generate the on-screen-display graphics and combine those graphics with an encoded video stream of data. Instead, the digital VCR using the HAVi architecture generates commands which are transmitted to the display device and utilized by the display device to generate the on-screen-display graphics. In such a configuration it is not necessary for the digital VCR to include an MPEG encoder, because the on-screen-display graphics are generated and combined with the video data by the television. However, the extent and capability of such on-screen-display graphics available through the HAVi architecture using such commands is limited.

Some video source devices have the ability to generate very high bandwidth graphics output which is sent to a display device, such as a television, for on-screen-display to the user. This graphics output can be of very high resolution and color depth, including dynamic animation effects with multiple portions of the graphics data changing on a frequent basis. This graphics data is typically mixed with, or overlaid on top of, a video signal. As described above, it is relatively easy and inexpensive to provide capability within an analog device to combine on-screen-display graphics with a video stream of data and send the combined stream of data to a television or other display device for display to a user or users. It is also relatively easy and inexpensive for a device, such as a video game console to generate a pure graphics output stream and send this output stream over an analog video connection to the television. However, for digital devices, it is quite expensive, to include within the device, the capability to generate graphics data and encode the graphics data into a format such as MPEG video in which digital data is typically transmitted. It is cost prohibitive for most consumer devices such as VCRs and video game consoles to include the ability to generate on-screen-display graphics for combination with video and/or transmission to a digital display device as an MPEG stream of video. The HAVi architecture provides one method which allows a source device to control on-screen-display graphics on a display device by providing data and/or commands to the display device, which then generates the graphics. However, the on-screen-display graphics available to be generated using the HAVi architecture are generally not high bandwidth graphics.

SUMMARY OF THE INVENTION

On-screen-display graphics data is transmitted from a source device to a display device over an IEEE 1394-1995 serial bus network utilizing an isochronous data format. The on-screen-display graphics data is generated by the source device and transmitted to a display device, as a stream of isochronous data, separate from video data. Each packet of isochronous data within the stream of on-screen-display graphics data includes an address value corresponding to a memory address within the display device forming a buffer. When received by the display device the on-screen-display graphics data is loaded into the appropriate memory locations within the buffer corresponding to the address values. At the display device, an embedded stream processor is utilized to strip the header information from each packet and determine the appropriate memory location that the data is to be stored. A trigger packet is sent at the end of the data stream for a screen of on-screen-display graphics. The trigger packet includes a presentation time value corresponding to a display time for the screen of on-screen-display graphics. When the trigger packet is received, the display device transfers the data stored in the buffer to a VRAM circuit for display at the specified presentation time. The on-screen-display graphics data can be overlaid on video data for display and also displayed separately. The trigger packet includes a trigger bit and an overlay bit. The trigger bit, when written, signals that the storage of the current frame is complete. The overlay bit specifies whether or not the current on-screen-display graphics data frame is to be overlaid on a video data frame. Differential encoding is used when transferring frames of data wherein only a portion of data changes from the previous frame.

In one aspect of the invention, a method of transmitting on-screen-display graphics data from a source device to a display device separate from a video stream of data includes the steps of generating on-screen-display graphics to be displayed on the display device, combining the on-screen-display graphics into a stream of data packets, each including an address value corresponding to a memory location within the display device and transmitting the data packets from the source device to the display device. The method further includes the step of transmitting a trigger packet on occurrence of a trigger event, the trigger packet including a trigger address value corresponding to a trigger memory location within the display device. The trigger packet preferably includes a trigger bit, which when written into a trigger memory location, signals that storage of a current frame of on-screen-display graphics data is complete. The trigger packet also includes an overlay bit specifying whether or not the on-screen-display graphics are to be combined with video data. Preferably, the data packets are isochronous packets. Alternatively, the data packets are asynchronous packets.

In another aspect of the invention, a method of transmitting on-screen-display graphics data from a source device to a display device includes the steps of generating on-screen-display graphics to be displayed on the display device, combining the on-screen-display graphics into a stream of isochronous data packets, each including an address value corresponding to a memory location within the display device and transmitting the isochronous data packets from the source device to the display device over an isochronous channel. The method further includes the steps of receiving the isochronous data packets at the display device and storing data included within each of the isochronous data packets at the memory location specified by the address value included within the isochronous data packet. The method further includes the steps of compressing the on-screen-display graphics before the isochronous data packets are formed and decompressing the data at the display device before the step of storing is completed. The method also includes the step of transmitting a trigger packet on the occurrence of a trigger event, the trigger packet including a trigger address value corresponding to a trigger memory location within the display device. The trigger packet further includes a presentation time value specifying a display time for the on-screen-display graphics. The trigger event occurs when all isochronous data packets for a screen of the on-screen-display graphics have been transmitted. The method still further includes the steps of receiving the isochronous data packets at the display device, storing data included within each of the isochronous data packets at the memory location specified by the address value included within the isochronous data packet, receiving the trigger packet at the display device, storing the trigger packet at the trigger memory location and displaying the screen of on-screen-display graphics at the display time. The memory locations and the trigger memory location within the display device are included within an on-screen-display graphics buffer. Alternatively, the memory locations are preferably included within an on-screen-display graphics buffer and the trigger memory location is included within a trigger buffer. The trigger packet preferably includes a trigger bit, which when written into a trigger memory location, signals that storage of a current frame of on-screen-display graphics data is complete. The trigger packet also includes an overlay bit specifying whether or not the on-screen-display graphics are to be combined with video data. The isochronous data packets and the trigger packet are transmitted from the source device to the display device over a high speed serial interface. Preferably, the high speed serial interface is an IEEE 1394 serial bus network. The method also includes the steps of generating a subsequent screen of on-screen-display graphics to be displayed on the display device, determining changed pixels within the subsequent screen as compared to a previous screen of on-screen-display graphics, combining the on-screen-display data representing only the changed pixels into a differential stream of isochronous data packets, each differential isochronous packet including an address value corresponding to the memory location related to represented changed pixels and transmitting the isochronous data packets from the source device to the display device over the isochronous channel.

In another aspect of the present invention, a method of receiving on-screen-display graphics data, generated by a source device and transmitted in isochronous data packets over an isochronous channel, each isochronous data packet including an address value corresponding to a memory location within the display device, includes the steps of receiving an isochronous data packet including on-screen-display graphics data and the address value and storing the on-screen-display graphics data included within the isochronous data packet at the memory location within the display device. The method further includes the steps of receiving a trigger packet including a trigger address value, corresponding to a trigger memory location within the display device, and presentation time value specifying a display time for the on-screen-display graphics and displaying the on-screen-display graphics at the display time. The method further includes the step of storing the trigger packet at the trigger memory location. The trigger packet preferably includes a trigger bit, which when written into the trigger memory location signals that storage of a current frame of on-screen-display graphics data is complete. The method still further includes the step of decompressing the on-screen-display graphics, if the on-screen-display graphics had previously been compressed, before the step of storing is completed. The memory locations and the trigger memory location are included within an on-screen-display graphics buffer. The isochronous data packets and the trigger packet are transmitted from the source device to the display device over a high speed serial interface. Preferably, the high speed serial interface is an IEEE 1394 serial bus network.

In yet another aspect of the present invention, an apparatus for transmitting on-screen-display graphics data from a source device to a display device includes a graphics source for generating on-screen-display graphics to be displayed by the display device and an interface circuit coupled to the graphics source and configured for coupling to the display device for combining the on-screen-display graphics into a stream of isochronous data packets each including an address value corresponding to a memory location within the display device and transmitting the isochronous data packets from the source device to the display device over an isochronous channel. The graphics source also generates a trigger packet which is transmitted by the interface circuit on the occurrence of a trigger event, the trigger packet including a trigger address value corresponding to a trigger memory location within the display device. The trigger event occurs when all isochronous data packets for a screen of on-screen-display graphics have been transmitted from the interface circuit. The trigger packet further includes a presentation time value specifying a display time for the screen of on-screen-display graphics. The trigger packet preferably includes a trigger bit, which when written into a trigger memory location, signals that storage of a current frame of on-screen-display graphics data is complete. The trigger packet also includes an overlay bit specifying whether or not the on-screen-display graphics are to be combined with video data. The apparatus further includes a compression circuit coupled to the graphics source and to the interface circuit for compressing the on-screen-display graphics before transmission by the interface circuit. The interface circuit is preferably coupled to the display device by a high speed serial interface. Preferably, the high speed serial interface is an IEEE 1394 serial bus network.

In still yet another aspect of the present invention, an apparatus for receiving on-screen-display graphics data generated by a source device and transmitted in isochronous data packets over an isochronous channel, each isochronous data packet including an address value corresponding to a memory location, includes an interface circuit configured for coupling to the source device for receiving the isochronous data packets from the source device over the isochronous channel, a processing device coupled to the interface circuit for receiving the isochronous data packets and separating the address value from the on-screen-display graphics data, a memory device coupled to the processing device to store the on-screen-display graphics data in a memory location corresponding to the address value and a display device coupled to the memory device for displaying the on-screen-display graphics at a display time. The display time is received in a trigger packet. Preferably, the processing device is an embedded stream processor which determines if on-screen-display graphics data is included within the isochronous data packets, strips header information from the isochronous data packets, determines the address value and transmits the address value and the on-screen-display graphics data to the memory device. The memory device includes a buffer and a DMA engine which receives the address value and stores the on-screen-display graphics data in the memory location corresponding to the address value within the buffer. The display device includes a display and a VRAM circuit in which the on-screen-display graphics are stored before being displayed on the display. The interface circuit is preferably coupled to the source device by a high speed serial interface. Preferably, the high speed serial interface is an IEEE 1394 serial bus network.

In another aspect of the present invention, a system for transmitting on-screen-display graphics data includes a source device including a graphics source for generating on-screen-display graphics to be displayed by a display device and a source interface circuit coupled to the graphics source and configured for coupling to the display device for combining the on-screen-display graphics into a stream of isochronous data packets each including an address value corresponding to a memory location within the display device and transmitting the isochronous data packets from the source device to the display device over an isochronous channel and a display device including a display interface circuit coupled to the source interface circuit for receiving the isochronous data packets from the source device over the isochronous channel, a processing device coupled to the display interface circuit for receiving the isochronous data packets and separating the address value from the on-screen-display graphics data, a memory device coupled to the processing device to store the on-screen-display graphics data in a memory location corresponding to the address value and a display device coupled to the memory device for displaying the on-screen-display graphics at a display time. The graphics source also generates a trigger packet which is transmitted by the interface circuit on the occurrence of a trigger event, the trigger packet including a trigger address value corresponding to a trigger memory location within the display device. The trigger event occurs when all isochronous data packets for a screen of on-screen-display graphics have been transmitted from the source interface circuit. The trigger packet further includes a presentation time value specifying the display time for the screen of on-screen-display graphics. The trigger packet preferably includes a trigger bit, which when written into a trigger memory location, signals that storage of a current frame of on-screen-display graphics data is complete. The trigger packet also includes an overlay bit specifying whether or not the on-screen-display graphics are to be combined with video data. The processing device is an embedded stream processor which determines if on-screen-display graphics data is included within the isochronous data packets, strips header information from the isochronous data packets, determines the address value and transmits the address value and the on-screen-display graphics data to the memory device. The memory device includes a buffer and a DMA engine which receives the address value and stores the on-screen-display graphics data in the memory location corresponding to the address value within the buffer. The display device includes a display and a VRAM circuit in which the on-screen-display graphics are stored before being displayed on the display. The source interface circuit is preferably coupled to the display interface circuit by a high speed serial interface. The high speed serial interface is preferably an IEEE 1394 serial bus.

DETAILED DESCRIPTION OF THE PREFERRED EMBODIMENT

Figure 1:
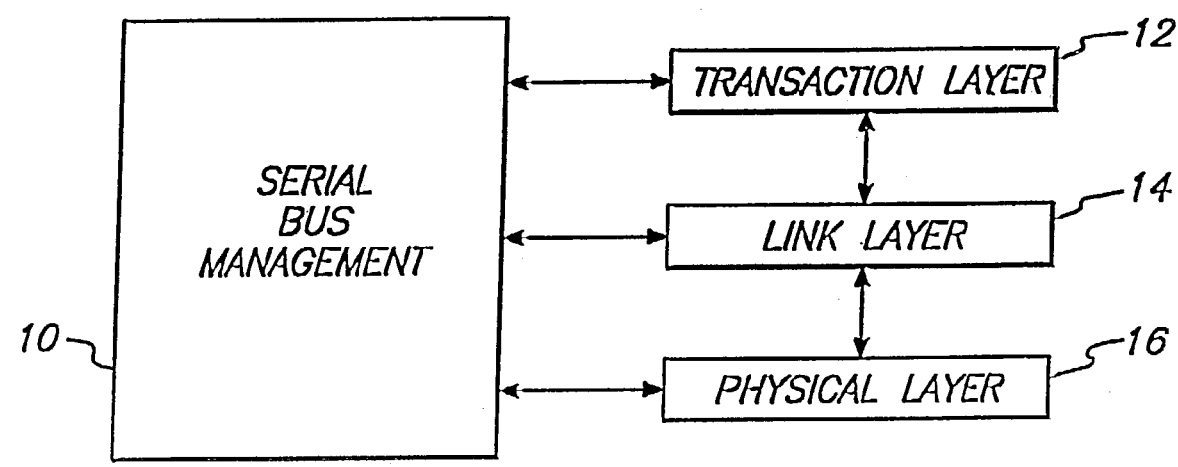
FIG. 1 illustrates a protocol defined by the IEEE 1394-1995 standard.
Figure 2:
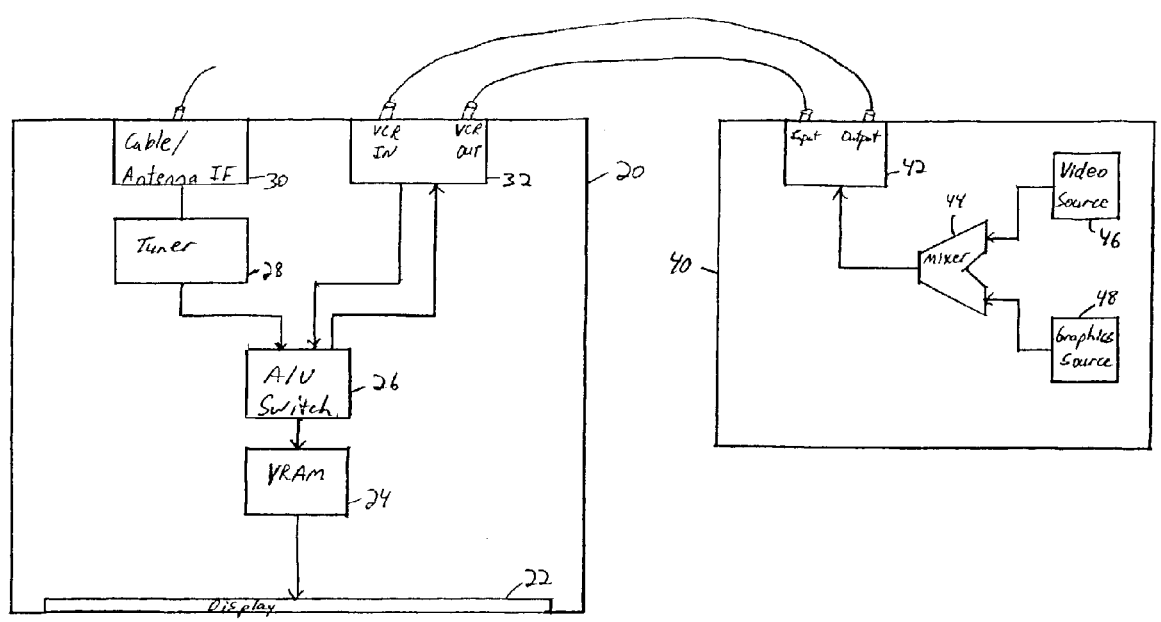
FIG. 2 illustrates a block diagram of a conventional home audio/video network including a television and VCR.

An isochronous data format is utilized to transmit on-screen-display graphics from a source device to a display device. The on-screen-display graphics are generated by the source device, such as a VCR, and transmitted to a display device, as a stream of isochronous data, separate from non on-screen-display graphics data. Non on-screen-display graphics data includes other types of data such as video data, audio data and any other appropriate type of data sent from a source device to a display device. The source device preferably does not encode the on-screen-display graphics stream of data into a format such as MPEG. Alternatively, the on-screen-display graphics stream of data is mixed with another stream of data, such as video data, and encoded into a format such as MPEG. Each packet of isochronous data within the stream of on-screen-display graphics data includes an address value. When received by the display device the on-screen-display graphics data is loaded into an on-screen-display buffer at memory locations corresponding to the address values. At the display device, an embedded stream processor is preferably utilized to strip the header information from each packet and determine the appropriate memory location at which the data is to be stored. Alternatively, any other appropriate general or special purpose processing mechanism is used to strip the header information from each packet and determine the appropriate memory location at which the data is to be stored.

A trigger packet is sent at the end of a data stream for a screen of on-screen-display graphics. The trigger packet includes a presentation time value corresponding to a display time for the screen of on-screen-display graphics. After a trigger packet is received, the display device then displays the on-screen-display graphics from the on-screen-display buffer at the time indicated by the presentation time value. The trigger packet also includes a trigger bit and an overlay bit. The trigger bit, when written, signals that the storage of the current frame is complete. The overlay bit specifies whether or not the current on-screen-display graphics data frame is to be overlaid on a video data frame. If the on-screen-display graphics data is displayed with video data, the display device preferably decodes the video stream of data and then combines the decoded video stream of data with the on-screen-display graphics data for display. Preferably, the source device is coupled to the display device by an IEEE 1394-1995 serial bus network. Differential encoding is preferably used for changing or animated graphics wherein only the portion of data that changes from the previous frame is transmitted.

Preferably, the on-screen-display graphics data is sent separate from any other data streams. Alternatively, the on-screen-display graphics data is mixed into a combined data stream for transmission. Multiple streams of on-screen-display graphics data can be sent to a single display device. Multiple streams of on-screen-display graphics data can also be coordinated and sent to multiple display devices. These multiple streams of on-screen-display graphics data can be sent from a single source device or from multiple source devices. Furthermore, a single stream of on-screen-display graphics data can be sent simultaneously to multiple display devices.

Figure 3:
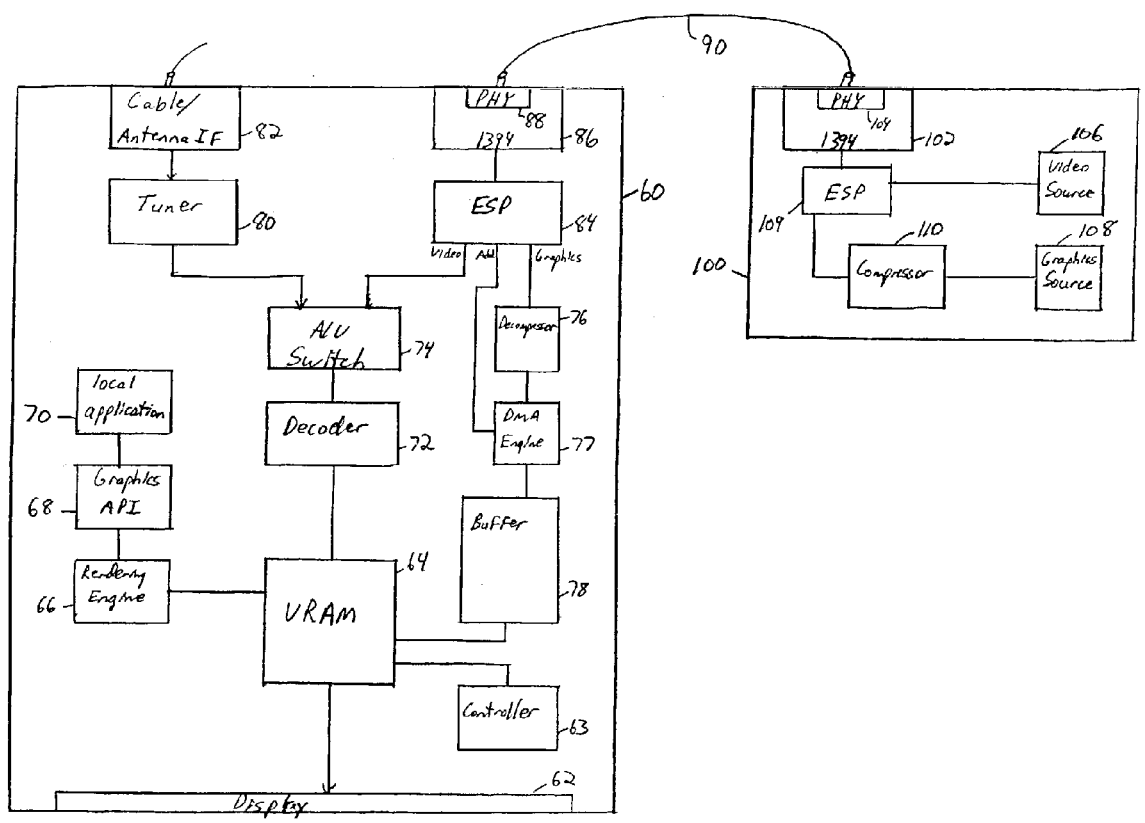
FIG. 3 illustrates a block diagram of an exemplary network of devices according to the present invention, including a television and a VCR.

A block diagram of an exemplary network of devices including a television 60 and a VCR 100 connected together by an IEEE 1394-1995 cable 90 is illustrated in FIG. 3. Relevant components of the television 60 and the VCR 100 are also illustrated in FIG. 3. The television includes an IEEE 1394-1995 interface circuit 86 through which data and commands are sent to and received from the VCR 100. The IEEE 1394-1995 interface circuit 86 includes a physical interface circuit 88. The physical interface circuit 88 is coupled to the VCR 100 by the IEEE 1394-1995 serial bus cable 90. The IEEE 1394-1995 interface circuit 86 is preferably coupled to an embedded stream processor 84 which receives and routes communications from the VCR 100. The embedded stream processor 84 is coupled to an audio/video switch 74 for providing video data from the VCR 100. The embedded stream processor 84 is also coupled to a decompression circuit 76 for decompressing compressed on-screen-display graphics data. The decompression circuit 76 is coupled to a DMA engine 77 used in the processing of on-screen-display graphics data. The DMA engine 77 is also coupled to receive addressing information from the embedded stream processor 84. The DMA engine 77 is also coupled to an on-screen-display addressable memory buffer 78 for storing decompressed on-screen-display graphics data from the VCR 100 in the locations specified by the addressing information from the embedded stream processor 84. The buffer 78 is coupled to a VRAM circuit 64 for providing the decompressed on-screen-display graphics data to the display 62.

The television 60 also includes a cable/antenna interface circuit 82 which is coupled to receive input signals from a coaxial cable or an antenna and to pass those signals through a tuner 80 to the audio/video switch 74. The audio/video switch 74 is coupled to a decoding circuit 72 for decoding any encoded video signals and providing the decoded video signals to the VRAM circuit 64. The television 60 also includes one or more local applications 70 which are coupled to a graphics applications programming interface 68 for receiving commands representing on-screen-display graphics to be generated and displayed by the television 60. The graphics applications programming interface 68 is coupled to a rendering engine 66 which receives the commands and generates appropriate on-screen-display graphics from the commands. The rendering engine 66 is coupled to the VRAM circuit 64 to provide the generated on-screen-display graphics to the VRAM circuit 64. Preferably, the VRAM circuit 64 includes mixing capability to mix different streams of data and to mix different types of data, as appropriate, for display. The VRAM circuit 64 is coupled to the display 62 for providing the video signals to the display 62. A controller 63 is also coupled to the VRAM circuit 64 in order to control the operation of the VRAM circuit 64 and to control which device or devices have access to the VRAM circuit 64 at a given time.

The VCR 100 includes an IEEE 1394-1995 interface circuit 102 through which data and commands are sent to and received from the television 60. The IEEE 1394-1995 interface circuit 102 includes a physical interface circuit 104. The physical interface circuit 104 is coupled to the television 60, over the IEEE 1394-1995 serial bus cable 90. The VCR 100 includes a video source 106, such as a video tape, which is being played by the VCR 100, or a television input. The video source 106 is coupled to an embedded stream processor 109, which is coupled to the IEEE 1394-1995 interface circuit 102 for transmitting video streams of data over the IEEE 1394-1995 serial bus cable 90 to the television 60. The VCR 100 also includes a graphics source 108 which generates on-screen-display graphics to be displayed by the television 60. The graphics source 108 is preferably coupled to a compression circuit 110 which compresses the graphics data generated by the graphics source 108. The compression circuit 110 is coupled to the embedded stream processor 109 which is coupled to the IEEE 1394-1995 interface circuit 102 for transmitting the compressed graphics data over the IEEE 1394-1995 serial bus cable 90 to the television 60. The embedded stream processor 109 has similar capability to the embedded stream processor 84 and processes data from the source device 100 before it is transmitted over the IEEE 1394-1995 serial bus cable 90. This processing includes attaching headers to packets of data being transmitted from the source device 100. In an alternate embodiment, the source device does not include the embedded stream processor 109.

The configuration illustrated in FIG. 3 is exemplary only. It should be apparent that an audio/video network could include many different combinations of components. It should be recognized that data, commands and parameters can be sent in either direction between the devices within the IEEE 1394-1995 network, as appropriate.

Utilizing the present invention, the VCR 100 can efficiently transmit an encoded video stream of data from the video source 106 to the television 60 over the IEEE 1394-1995 serial bus cable 90. The VCR 100 also has the capability to generate on-screen-display graphics to be displayed by the television 60. The on-screen-display graphics are generated by the graphics source 108 and preferably transmitted to the television 60 in an isochronous format over the IEEE 1394-1995 serial bus cable 90, separate from other streams of data including the video stream of data. Alternatively, the on-screen-display graphics from the graphics source 108 are combined with the video stream of data from the video source 106 and transmitted in a digital format over the IEEE 1394-1995 serial bus cable 90. Preferably, the on-screen-display graphics are compressed by the compression circuit 110 in any available and appropriate manner, before transmission to the television 60. Alternatively, the on-screen-display graphics are transmitted without any compression. In a further alternate embodiment, the on-screen-display graphics are transmitted asynchronously over the IEEE 1394-1995 serial bus cable 90, using asynchronous packets.

When received by the television 60, the on-screen-display graphics are separated by the embedded stream processor 84 and loaded into memory locations within the buffer 78 corresponding to the address value contained within the isochronous packet. After the last packet of on-screen-display graphics data for a screen or frame is sent from the VCR 100, the VCR 100 then sends a trigger packet containing information relating to a display time at which the television 60 is to display the on-screen-display graphics data. Upon receipt of the trigger packet, the television 60 then loads the data within the on-screen-display buffer 78 into the VRAM circuit 64 to be shown on the display 62 at the appropriate time specified by the presentation time value within the trigger packet. If the data within the on-screen-display buffer 78 is compressed, then the decompression circuit 76 will decompress the on-screen-display graphics data before it is provided to the VRAM circuit 64.

Preferably, the transmission and processing of the on-screen-display graphics data, as described above, is performed on a full frame of data. Alternatively, the transmission and processing operations can be performed on smaller portions of data, such as a scan line. This alternative embodiment allows the source device and the display device to incorporate smaller data buffers, since less data needs to be stored. In all cases, the final stage of dumping the final data into the VRAM circuit 64 requires the accumulation of one frame of data, then switching the VRAM circuit 64 to be visible to the user, allowing smooth transitions between frames of on-screen-display graphics data.

Figure 4:
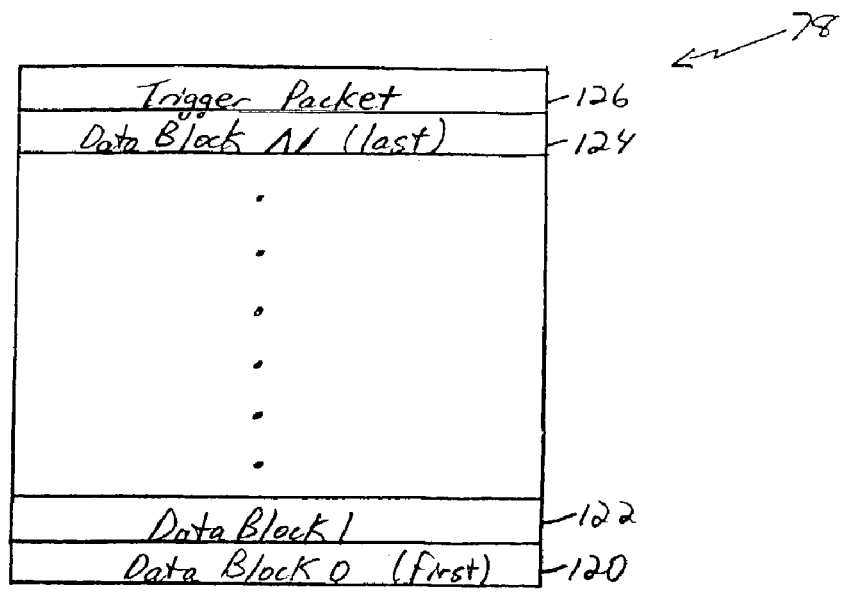
FIG. 4 illustrates the preferred configuration of the on-screen-display graphics memory buffer of the present invention.

The preferred configuration of the on-screen-display graphics memory buffer 78 is illustrated in FIG. 4. The memory buffer 78 includes a number of memory storage locations 120–124 in which collectively a frame of data is stored. Each of the memory storage locations 120–124 is individually addressable. However, when writing to the memory buffer 78, after an address is specified, data is written to successively increasing addresses within the memory buffer 78 until a subsequent address value is provided. Preferably, the final storage location 126 within the memory buffer 78 stores the trigger packet which is used to time the display of data within the memory buffer 78. Alternatively, the trigger packet is stored within any other appropriate and designated trigger memory buffer or location.

A differential encoding scheme is preferably employed to transmit data from the source device to the display device. Using this differential encoding scheme, only packets with data changing from the previous frame to the current frame are transmitted from the source device. The packets transmitted from the source device with changing video data are then written into the appropriate memory storage locations within the memory buffer 78. When all of the changed packets for the current frame are loaded into the memory buffer 78, the trigger packet is then loaded into the final storage location 126. This differential encoding scheme minimizes the amount of data required to be transferred for each successive frame of on-screen-graphics data. Alternatively, the entire frame of data is transmitted from the source device to the display device for each frame of on-screen-display graphics data.

As will be described in detail below, preferably the trigger packet includes two quadlets of data. The most significant bit of the first quadlet is a trigger bit t which is set to a logical high voltage level. When the display device detects that the trigger bit within the memory buffer has been set to a logical high voltage level, that signals that the storage of the current frame within the memory buffer 78 is completed. The second-most significant bit of the first quadlet within the trigger packet is an overlay bit o, which specifies whether or not the current on-screen-display graphics data frame is to be overlaid on a video data frame. Preferably, if the overlay bit o is at a logical high voltage level, then the current on-screen-display graphics data frame is to be overlaid on a video data frame. If the current on-screen-display graphics data frame is to be overlaid on a video data frame, the television 60 mixes the current on-screen-display graphics data with the video data. Otherwise, if the overlay bit o is at a logical low voltage level, then the current on-screen-display graphics data frame is not to be overlaid on a video data frame. The remainder of the first quadlet is reserved and not used. The second quadlet within the trigger packet includes the presentation time value which specifies at which time, the current on-screen-display graphics data frame should be displayed. This presentation time value specifies a time from immediate display to display at any appropriate time value represented by the presentation time value.

Figure 5:
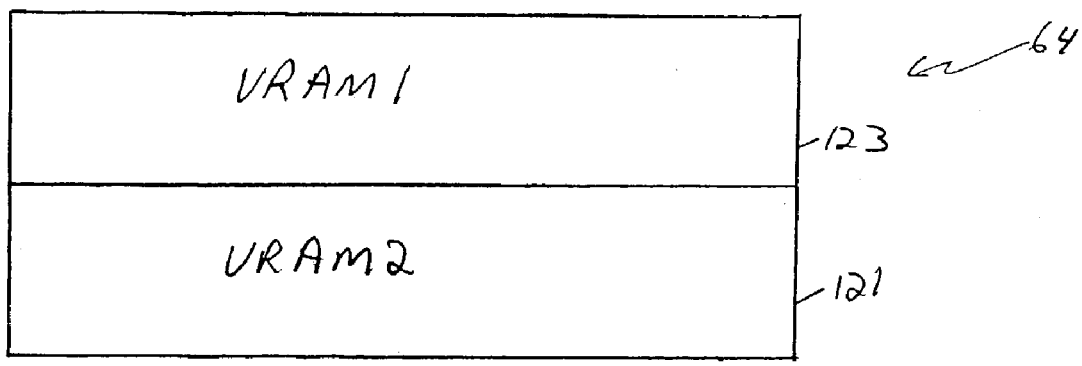
FIG. 5 illustrates the preferred configuration of the VRAM circuit of the present invention.

In order to provide smooth, flicker-free screen updates, the VPAM circuit 64 within the television 60 is preferably partitioned into two parts, as illustrated in FIG. 5. The VRAM circuit 64 preferably includes two portions, the VRAM circuit 123 and the VRAM circuit 121. Each of the VRAM circuits 121 and 123 preferably have the capacity to store a frame worth of data. The controller 63, within the television 60, manages the switching between the VRAM circuits 121 and 123. The data for a frame is first transferred into the VRAM circuit 123. When the VRAM circuit 123 has a frame of data, then the controller 63 causes the next frame of data to be stored within the VRAM circuit 121. When one of the VRAM circuits 121 and 123 is full, the controller 63 causes the data within the VRAM circuit 121 or 123 to be displayed on the display 62, at the appropriate presentation time.

Figure 6:
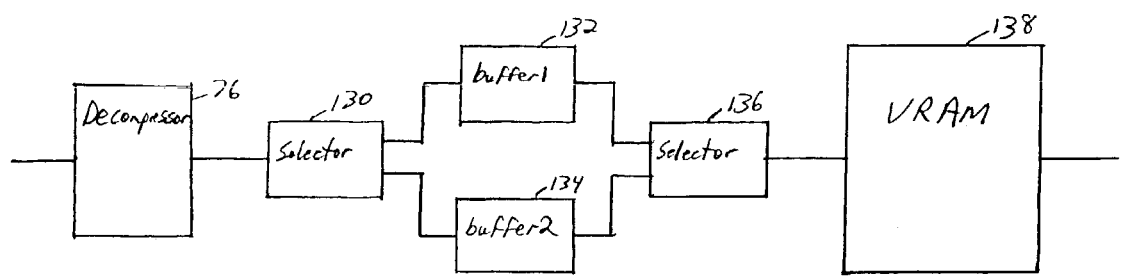
FIG. 6 illustrates an alternate configuration of the VRAM circuit of the present invention.

The VRAM circuit 64, illustrated in FIG. 5, is preferred because it is considered the most efficient method of handling the data to be displayed. However, this method requires enough VRAM to store two frames of data. An alternate embodiment, which reduces the necessary amount of VRAM is illustrated in FIG. 6. From the decompressor 76, the data is passed through a selector 130 which routes the data to either a first buffer 132 or a second buffer 134 in which the data is stored. The buffers 132 and 134 are not VRAM buffers, but are regular RAM buffers, each capable of storing a frame worth of data. The selector 136 then directs data from the appropriate buffer 132 or 134 into the VRAM circuit 138 to be shown on the display 62. This embodiment is less desirable, because it requires additional handling of the data through the buffers 132 and 134 and the selectors 130 and 136. However, this embodiment minimizes the amount of VRAM necessary, by utilizing less expensive RAM buffers.

Figure 7:
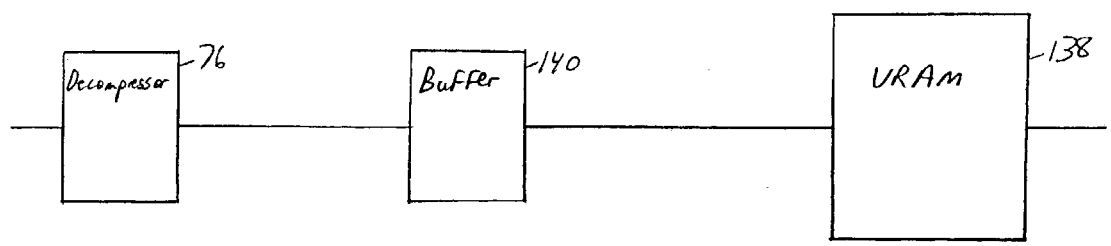
FIG. 7 illustrates an alternate configuration of the present invention including a single intermediate buffer between the decompressor and the VRAM circuit.

A further alternative embodiment includes a single intermediate buffer between the decompressor 76 and the VRAM circuit 138, as illustrated in FIG. 7. The single intermediate buffer 140 receives data from the decompressor 76 and transmits data to the VRAM circuit 138. In this embodiment, as the intermediate buffer 140 is transmitting a frame of data to the VRAM circuit 138, it is also simultaneously receiving data from the decompressor 76 and storing that data within available memory locations. This embodiment uses a VRAM circuit 138 with capacity for only a single frame of data, with a single intermediate buffer. However, this embodiment also requires more precise coordination in the entire data handling process, as data is simultaneously transferred from and stored in the intermediate buffer 140.

The VCR 100, or other source device, divides the on-screen-display graphics data from the graphics source 108 into portions corresponding to isochronous packets to be transmitted over the IEEE 1394-1995 serial bus cable 90. A frame of on-screen-display graphics data is divided into blocks of data, each of a size appropriate for transmission within an isochronous data packet. When differential encoding is used, only those packets with pixels which are different in the new frame are sent to the display device. However, because each data packet is delivered to a certain address within the on-screen-display buffer 78, it is preferred that a quadlet of data is sent when a pixel within the quadlet is changed. Accordingly, a minimum of four bytes is preferably included within any differentially encoded data packet.

Figure 8:
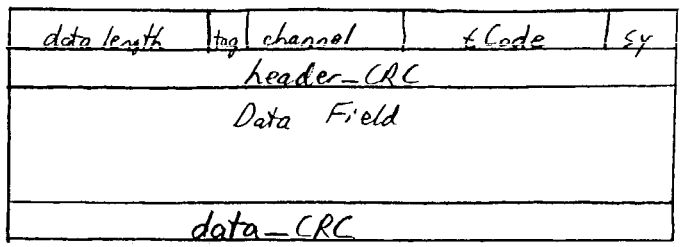
FIG. 8 illustrates the preferred format of an isochronous data packet for transmitting on-screen-display graphics data according to the present invention.

A preferred format of an isochronous data packet for transmitting on-screen-display graphics data over an IEEE 1394-1995 serial bus network is illustrated in FIG. 8. The format of the data packet also complies with the ISO/IEC 61883 standard. The isochronous data packet includes a packet header and a data field or payload. The isochronous packet header includes a data_length field, a tag field, a channel field, a tCode field, an sy field and a header_CRC field. The data length field contains a value representing the number of bytes of data within the data field, including the number of bytes within a CIP (common isochronous packet) header included in the packet. The tag field provides a high level label for the format of data carried by the isochronous packet. The channel field contains the channel number on which the isochronous packet is transmitted. The tCode field contains a transaction code for the packet. For isochronous data packets, the tCode field contains either a value of Ah or Ch. The sy field contains a synchronization flag used in some applications to synchronize the data in the current isochronous packet with some application specific event.

Figure 9:
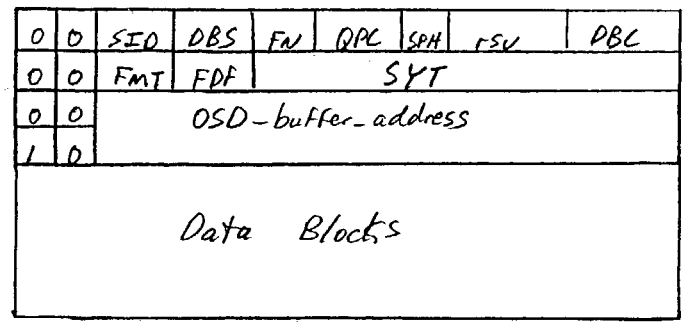
FIG. 9 illustrates the preferred format of the data field of an isochronous data packet of the present invention.

A format of the data field of the isochronous packet used to transmit on-screen-display graphics according to the present invention is illustrated in FIG. 9. The data field includes an extended CIP header and a data portion. The extended CIP header includes an end of header bit within each quadlet and a form bit within the two most significant bits of each quadlet. In the preferred format of the extended CIP header, the end of header bit is not set to a logical "1" until the fourth and last quadlet within the extended CIP header. When the end of header bit has a value of logical "1," this signals that the current quadlet is the last quadlet within the CIP header. Within the CIP header, the SID field contains the source node ID value of the transmitting node. The DBS field contains a value representing the size of the data block in quadlets. The FN field contains a fraction number representing the number of data blocks into which a source packet is divided. The QPC field contains a value representing the number of dummy quadlets added to a source packet to equalize the size of the divided data blocks. If the FN field indicates that the source packet is not divided, then the QPC field will contain a value equal to zero. The SPH flag represents whether or not the source packet includes a source packet header. The SPH flag is set equal to a logical "one" when the source packet does include a source packet header. The rsv field is reserved for future extension. The DBC field is the continuity counter of data blocks to detect a loss of data blocks. The FMT field includes a format identifier which identifies the format of the packet. The FDF field is a format dependent field and depends on the format of the packet. The SYT field is used to synchronize the transmitter and the receiver. The OSD_buffer_address field contains the address to which the on-screen-display graphics data contained within the isochronous packet is to be stored within the on-screen-display graphics data buffer 78. The remaining data portion contains the actual on-screen-display graphics data payload within the isochronous packet.

Figure 10:
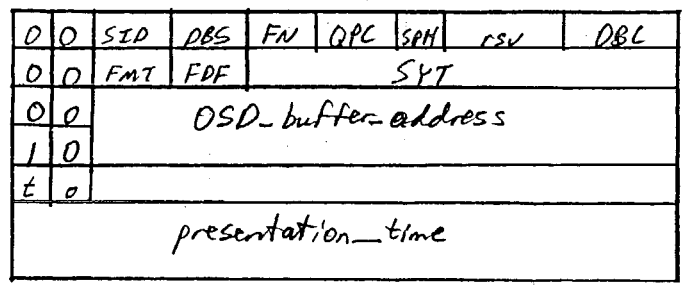
FIG. 10 illustrates the preferred format of the data field of a trigger packet of the present invention.

A trigger packet is preferably an isochronous data packet and has the same format as illustrated in FIG. 8. The data field however is different than the data field for an on-screen-display graphics data packet as illustrated in FIG. 9. The preferred format of a data field for a trigger packet is illustrated in FIG. 10. The format of the extended CIP header portion of the data field is the same as the format illustrated in FIG. 9, and discussed above. The OSD_buffer_address field contains the value representing the address to which the trigger packet is to be written. Within the data payload, the trigger packet preferably includes three quadlets. The first quadlet includes a trigger bit t as the most significant bit, which is set to a value of logical "1" for a trigger packet. The second-most significant bit of the first quadlet within the trigger packet is an overlay bit o. The overlay bit o specifies whether or not the current on-screen-display graphics data frame is to be overlaid on a video data frame. The second and third quadlets within the trigger packet include the presentation_time field which preferably contains a sixty-four bit value representing a time value at which the current frame of on-screen-display graphics data is to be displayed. A presentation time value of all logical "0"s specifies an immediate presentation time.

When the trigger bit t is written, the display device is notified that the buffer 78 includes a full frame of on-screen-display graphics data ready to be displayed at the appropriate presentation time. The data is then transferred to the VRAM circuit 64, for display at the time specified by the presentation time value. While it is preferred to include the trigger bit t, as should be apparent to those skilled in the art, it is possible that the trigger bit is not necessary. In an alternate embodiment, a write transaction of the trigger packet including the presentation time value acts as the trigger event, and the display device then is notified that the buffer 78 includes a frame of on-screen-display graphics data to be displayed at the time specified by the presentation time value.

When communication is initialized between an on-screen-display graphics source device and a display device, negotiation occurs between the source device and the display device to determine the parameters to be used for transmission and processing of the on-screen-display graphics data. This negotiation processing includes determining parameters such as the address of the on-screen-display buffer 78 within the display device, the size of the on-screen-display buffer 78 and attributes of the on-screen-display graphics data, such as bit depth. Preferably, the address of the on-screen-display buffer 78 is fixed to be the same address within all display devices. Alternatively, the address of the on-screen-display buffer 78 is defined by the display device to be either a single buffer base address or an address corresponding to one of a plurality of buffers, utilized by the display device. At the display device, the negotiation process involves the determination of the isochronous channel on which the on-screen-display graphics data will be received and the allocation of the internal buffer which is to be used as the on-screen-display buffer for this channel.

Preferably, only one source device is writing to an on-screen-display graphics buffer 78 at any given time. Alternatively, the display device is capable of accommodating the simultaneous display of on-screen-display graphics from multiple on-screen-display buffers 78. This alternative embodiment is useful in display devices incorporating multiple display technology, such as picture-in-picture. Each of the buffers 78 is maintained separately for each display. In this embodiment, if the source devices all send on-screen-display graphics data to the same buffer address, then the embedded stream processor 84 receives this data and routes it to the appropriate on-screen-display buffer within the display device, depending on the isochronous channel on which the data is received.

The source device also preferably includes the ability to send multiple streams of on-screen-display graphics data to a single display device or to coordinate the display of multiple streams of on-screen-display graphics data on multiple display devices. The source device also includes the ability to simultaneously send a single stream of on-screen-display graphics data to multiple display devices for a coordinated display of the on-screen-display graphics.

Data packets which are received by the display device on isochronous channels for which no on-screen-display graphics buffer 78 is assigned are discarded by the embedded stream processor 84. In addition, incoming isochronous data packets without the correct header structure corresponding to an on-screen-display graphics data packet, as described above, are also discarded by the embedded stream processor 84. The embedded stream processor 84 recognizes an on-screen-display graphics data packet because of the specific combination of the end-of-header and form bits within the four quadlets of the extended CIP header.

Preferably, when an isochronous data packet is received on an isochronous channel being received by the television 60, the IEEE 1394-1995 interface circuit 86 forwards the packet to the embedded stream processor 84. The embedded stream processor 84 preferably acts as both a filter for unwanted isochronous packets and a processor of appropriately received on-screen-display isochronous data packets. For appropriately received isochronous data packets, the embedded stream processor 84 analyzes the received isochronous packet, determines if it contains video data or on-screen-display graphics data, strips the header from the packet and forwards the data payload to either the A/V switch 74, if the packet contains video data, or to the decompression circuit 76 if the packet contains on-screen-display graphics data. Preferably, the on-screen-display graphics data is compressed for transmission and must be decompressed before being processed. Alternatively, the on-screen-display graphics data is not compressed for transmission and the decompression circuit 76 is not necessary. The on-screen-display graphics data is then routed through the DMA engine 77, which is responsible for storing the data in the appropriate locations within the on-screen-display buffer 78, to the on-screen-display buffer 78. The DMA engine 77 receives addressing information from the embedded stream processor 84, specifying the location within the on-screen-display buffer 78 where the current on-screen-display graphics data is to be stored. From the DMA engine 77, the current on-screen-display graphics data is then stored in the appropriate locations within the on-screen-display buffer 78.

If the on-screen-display graphics data is compressed for transmission, then the data is routed through the decompression circuit 76 and decompressed before it is stored in the on-screen-display buffer 78. If compressed by the source device, the data is compressed in any known manner appropriate for the type of data being transmitted. The decompression circuit 76 then uses an appropriate decompression technique to decompress the compressed data. In an alternate embodiment, the decompression circuit 76 includes a working buffer which accumulates the data that has been decompressed. When the working buffer is full, the decompression circuit 76 then triggers the DMA engine 77, which routes the decompressed on-screen-display graphics data to the appropriate locations within the on-screen-display buffer 78. However, within the preferred embodiment of the present invention, the decompression circuit 76 does not include a working buffer, but instead supplies decompressed data directly to the DMA engine 77, one quadlet at a time. The DMA engine 77 receives the starting address for the data from the embedded stream processor 84. Accordingly, as long as the DMA engine receives data from the decompression circuit 76, the DMA engine will store the decompressed data at increasing address locations within the on-screen-display buffer 78. When the decompression circuit 76 is finished decompressing the on-screen-display graphics data for the current packet, the decompression circuit 76 notifies the DMA engine 77 that the packet has been completed. The DMA engine 77 and the decompression circuit 76 then wait for the next isochronous packet provided from the embedded stream processor 84.

The preferred embodiment of the embedded stream processors 84 and 109 are taught in U.S. patent application Ser. No. 08/612,322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference. The embedded stream processor 84 is programmable and will execute a series of instructions on a stream of data in order to perform operations and manipulations on the data as required to place the data in the appropriate format. Within the present invention, the embedded stream processor 84 receives the isochronous packets containing on-screen-display graphics data, strips the header from the packet, forwards the on-screen-display graphics data payload of the packet to the decompression circuit 76 and forwards the addressing information to the DMA engine 77. Within the present invention, the embedded stream processor 109 receives data from the video source 106 and the graphics source 108, attaches a header to the packets and forwards the packets to the IEEE 1394 interface circuit 102. It should be apparent to those skilled in the art that alternatively, any mechanism with appropriate processing capability can be used in place of the embedded stream processors 84 and 109.

Figure 11:
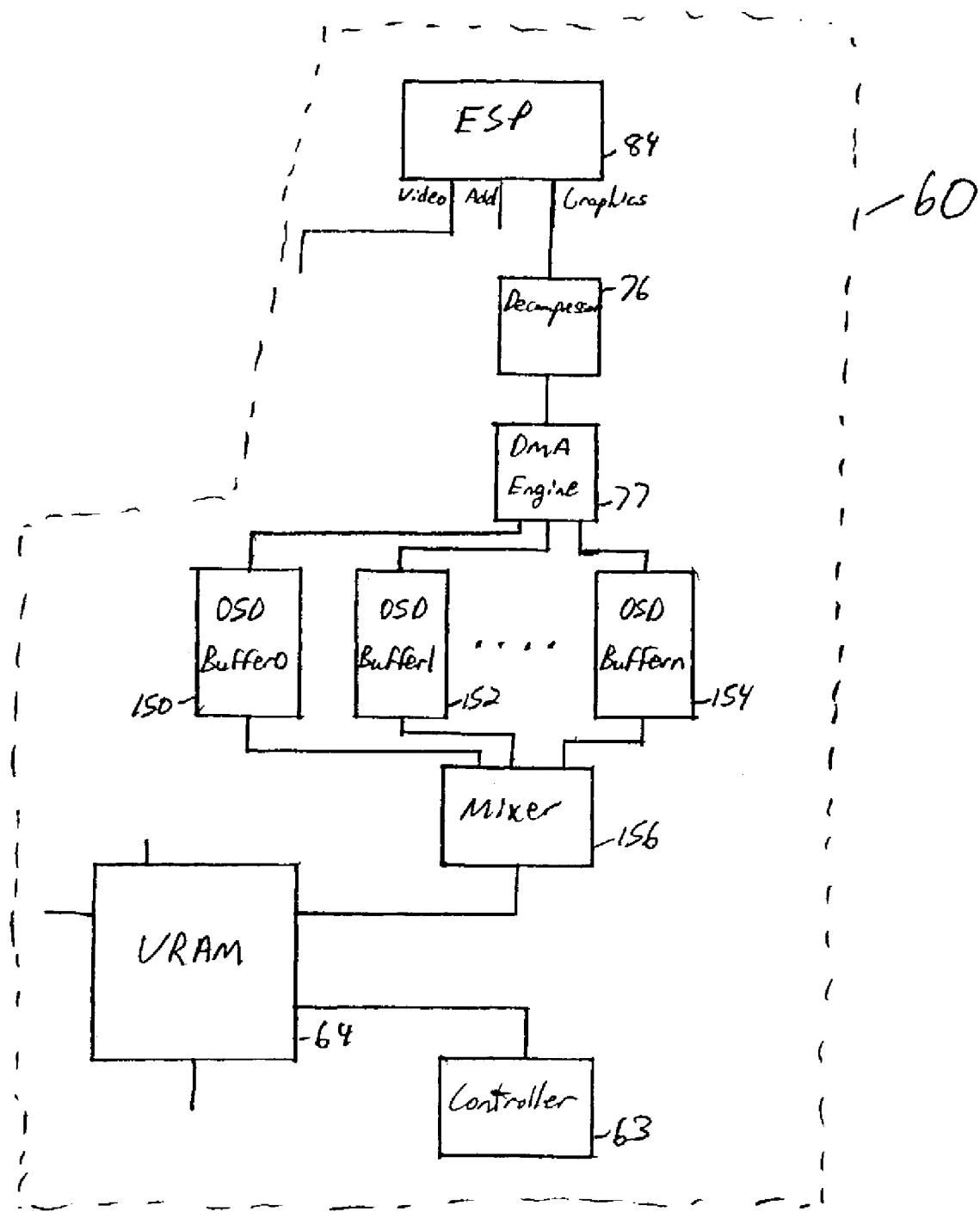
FIG. 11 illustrates a block diagram of data processing elements within an alternate embodiment of the television 60.

As described above, in an alternate embodiment of the present invention, the display device is capable of accommodating the simultaneous display of on-screen-display graphics from multiple on-screen-display buffers. The data processing components within the television 60 necessary for this embodiment are illustrated in FIG. 11. The DMA engine 77 is coupled to the on-screen-display buffers 150, 152 and 154. The on-screen-display buffers 150, 152 and 154 are each coupled to a mixer circuit 156. The mixer circuit 156 is then coupled to the VRAM circuit 64. In this embodiment, the embedded stream processor 84 within the television 60 tracks the association between incoming isochronous channel numbers and the on-screen-display buffers 150, 152 and 154. Each of the on-screen-display buffers 150, 152 and 154 is maintained separately and corresponds to an isochronous channel number. When the embedded stream processor 84 receives an isochronous data packet, the channel number is determined and the appropriate addressing information corresponding to the appropriate on-screen-display buffer address is provided to the DMA engine 77. The mixer circuit 156 then provides the on-screen-display graphics data from the buffers 150, 152 and 154 to the VRAM circuit 64. The mixer circuit 156 mixes the data from one or more buffers, as appropriate, for display to the user, including alternating between screens of data or combining screens of data for display.

Figure 12:
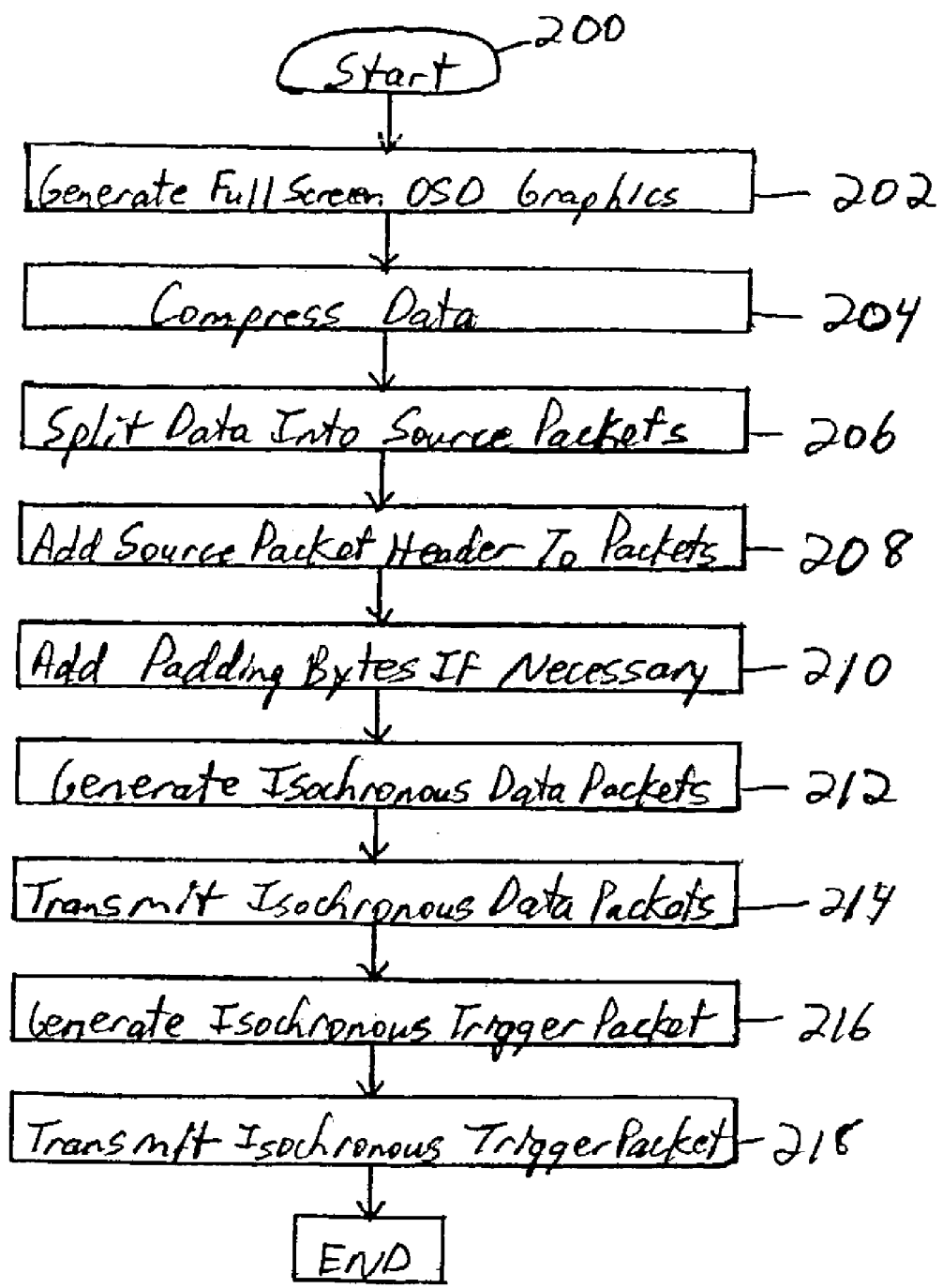
FIG. 12 illustrates a flow diagram of the preferred steps followed by the source device when transmitting a screen of on-screen-display graphics data.

A flowchart showing the preferred steps followed by the source device 100 when transmitting a screen of on-screen-display graphics data is illustrated in FIG. 12. The preferred method of transmitting begins at the step 200. At the step 202, a full screen of on-screen-display graphics data is generated by the graphics source 108. If differential encoding is being used, then only the on-screen-display graphics data for changing pixels is generated. At the step 204, the on-screen-display graphics data is transmitted to the compression circuit 110 and compressed. Alternatively, the compression step is skipped and the on-screen-display graphics data is not compressed. The compressed on-screen-display graphics data is then divided into source packets, at the step 206. Source packet headers are added to the source packets, at the step 208. If any of the source packets do not include enough data to make a full packet, then padding bytes are added at the step 210, in order to make each source packet, a full packet.

Figure 14:
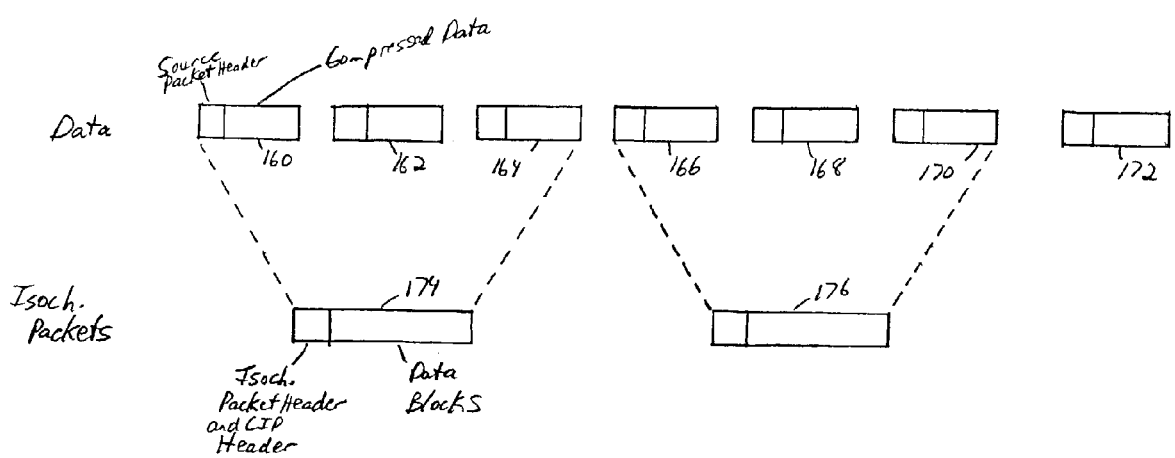
FIG. 14 illustrates the combination of a stream of source packets into a stream of isochronous packets.

The source packets containing compressed data are then combined into isochronous packets, including an isochronous packet header and a CIP header, by the embedded stream processor 109, at the step 212, and provided to the interface circuit 102. An illustration of a data stream of source packets being combined into isochronous data packets is shown in FIG. 14. Each of the source packets 160–172 include a source packet header and a data payload. A number of source packets are combined into an isochronous data packet. In the illustration shown in FIG. 14, the source packets 160, 162 and 164 are combined into the isochronous data packet 174 and the source packets 166, 168 and 170 are combined into the isochronous data packet 176. Each of the isochronous data packets include an isochronous packet header and a CIP header, as described above.

The isochronous data packets are then transmitted to the display device 60, over the IEEE 1394-1995 serial bus cable 90, at the step 214. When a screen of on-screen-display graphics data has been sent, then the isochronous trigger packet is generated, at the step 216, by the graphics source 108. At the step 218, the isochronous trigger packet is transmitted to the display device by the interface circuit 102. Once the trigger packet is transmitted, the process for this screen of on-screen-display graphics data ends at the step 220. The process illustrated in FIG. 12 is repeated for each screen of on-screen-display graphics data generated by the VCR 100.

Figure 13:
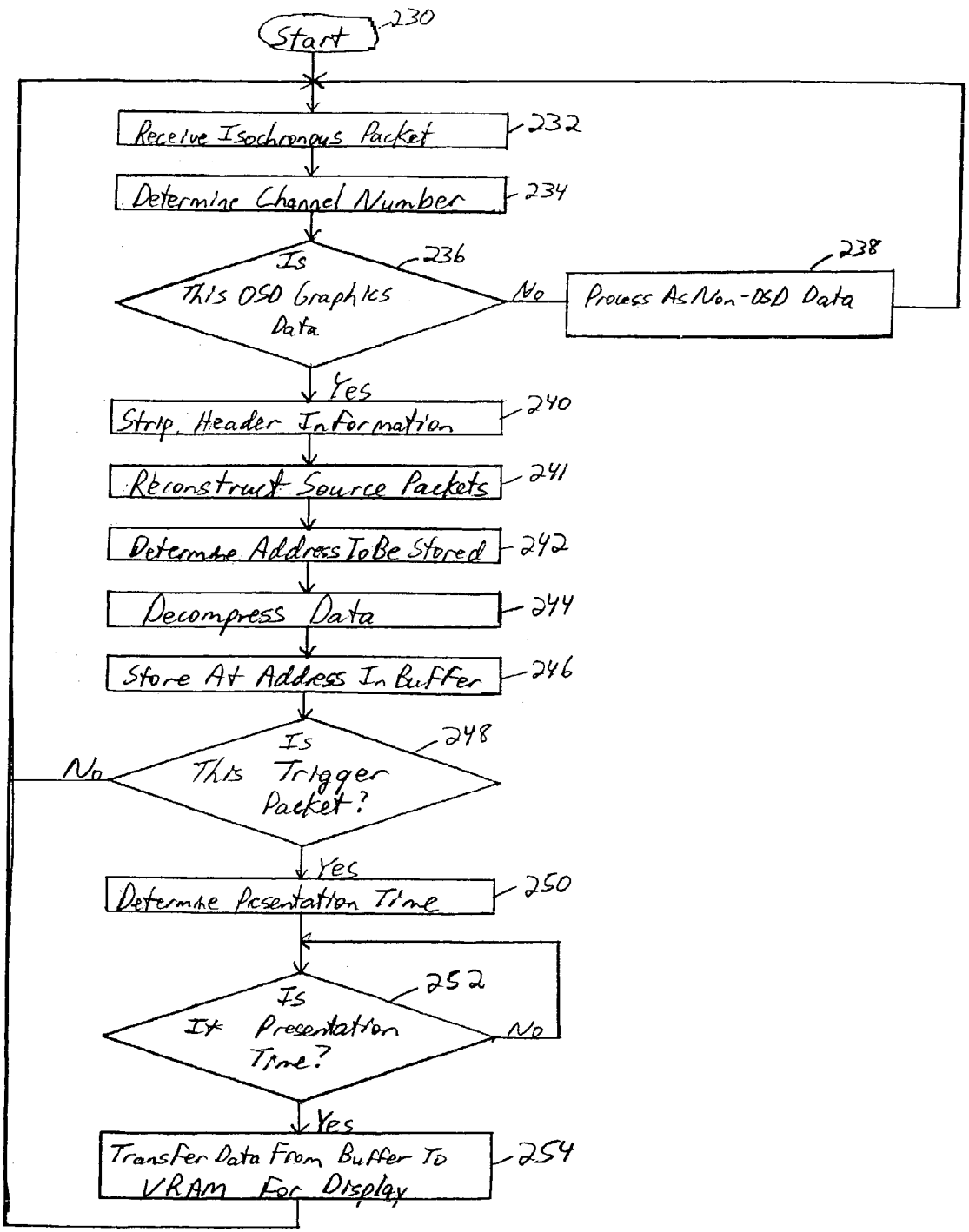
FIG. 13 illustrates a flow diagram of the preferred steps followed by the display device when receiving on-screen-display graphics data.

A flowchart showing the preferred steps followed by the display device 60 when receiving on-screen-display graphics data is illustrated in FIG. 13. The preferred method of receiving begins at the step 230. At the step 232, an isochronous packet of data is received by the display device. At the step 234, the channel number on which the isochronous packet of data was received is determined. It is then determined by the embedded stream processor 84, at the step 236, if the current isochronous data packet includes on-screen-display graphics data or video data. If the current isochronous data packet includes video data, audio data or other non on-screen-display graphics data, then the packet is transferred to the A/V switch 74 and processed as non on-screen-display graphics data, at the step 238, and the process returns to the step 232 to receive the next isochronous data packet. Otherwise, if the current isochronous data packet includes on-screen-display graphics data, then the header information from the packet is stripped off by the embedded stream processor 84 at the step 240. The source packets are then reconstructed, at the step 241, using the data within the source packet header.

At the step 242, the address within the buffer 78 to which the current data is to be stored is determined. If previously compressed, the on-screen-display graphics data is then provided to the decompression circuit 76 to be decompressed, at the step 244. The decompressed data is then stored at the appropriate address within the on-screen-display buffer 78, at the step 246. At the step 248, it is then determined if this data packet was the trigger packet. If the data packet was not the trigger packet, then the process returns to the step 232 to receive the next isochronous data packet.

If the current data packet is the trigger packet, then the presentation time value within the packet is determined at the step 250. The process then waits at the step 252 until it is the presentation time. When it is the presentation time, at the step 254, the data from the on-screen-display buffer 78 is transferred from the on-screen-display buffer 78 to the VRAM circuit 64 to be shown on the display 62. The process then returns to the step 232 to receive the next isochronous data packet.

As described herein, isochronous data packets are utilized to transmit on-screen-display graphics data from a source device to a display device. The isochronous data packets each include an address corresponding to a memory location within the display device. The on-screen-display graphics data is generated by the source device and transmitted to a display device, as a stream of isochronous data, preferably separate from non on-screen-display graphics data. Alternatively, the on-screen-display graphics data is combined with another stream of data, such as video data, and transmitted from the source device to the display device over a high speed serial interface, such as the IEEE 1394-1995 serial bus. No graphics primitives or specific graphics commands, such as HAVi commands, are used to display the on-screen-display graphics at the display device. Also, no encoding of the on-screen-display graphics data is required before the on-screen-display graphics data is transmitted from the source device. By allowing a device to transmit pure graphics data, without requiring any encoding, devices with limited video capabilities, such as mini-disks, can send graphics data to a display device for interfacing with a user. This can allow a user to do such things as configure a home audio system through a display device.

Each packet of on-screen-display graphics data includes an address value corresponding to a memory address within the display device forming an on-screen-display buffer. When received by the display device the on-screen-display graphics data is loaded into the appropriate memory locations within the on-screen-display buffer. An embedded stream processor is utilized to strip header information from each isochronous data packet and determine the appropriate memory location within the on-screen-display buffer that the data is to be stored. A trigger packet is then sent at the end of the stream of a screen of on-screen-display graphics data. When the trigger packet is received, the display device then transfers the data stored in the on-screen-display buffer to a VRAM circuit for display by the display device at a specified presentation time. If the on-screen-display graphics data is overlaid on a video stream of data, the display device decodes the video stream of data and then combines the decoded video stream of data with the on-screen-display graphics data for display. Differential encoding is used when transferring frames of data wherein only a portion of the data changes from a previous frame.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus.

We claim:

1. A method of transmitting on-screen-display graphics data from a source device to a display device comprising:
   a. generating on-screen-display graphics to be displayed on the display device;
   b. combining the on-screen-display graphics into a stream of isochronous data packets, each including an address value corresponding to a memory location within the display device;
   c. transmitting the isochronous data packets from the source device to the display device over an isochronous channel;
   d. receiving the isochronous data packets at the display device;
   e. storing data included within each of the isochronous data packets at the memory location specified by the address value included within the isochronous data packet;
   f. compressing the on-screen-display graphics before the isochronous data packets are formed; and
   g. decompressing the data at the display device before the storing is completed.

2. A method of transmitting on-screen-display graphics data from a source device to a display device comprising:
   a. generating on-screen-display araphics to be displayed on the display device;
   b. combining the on-screen-display graphics into a stream of isochronous data packets, each including an address value corresponding to a memory location within the display device;
   c. transmitting the isochronous data packets from the source device to the display device over an isochronous channel; and
   d. transmitting a trigger packet on the occurrence of a trigger event, the trigger packet including a trigger address value corresponding to a trigger memory location within the display device.

3. The method as claimed in claim 2 wherein the trigger packet further includes a presentation time value specifying a display time for the on-screen-display graphics.

4. The method as claimed in claim 3 wherein the trigger event occurs when all isochronous data packets for a screen of the on-screen-display graphics have been transmitted.

5. The method as claimed in claim 4 further comprising:
   a. receiving the isochronous data packets at the display device;
   b. storing data included within each of the isochronous data packets at the memory location specified by the address value included within the isochronous data packet;
   c. receiving the trigger packet at the display device;
   d. storing the trigger packet at the trigger memory location; and
   e. displaying the screen of on-screen-display graphics at the display time.

6. The method as claimed in claim 5 wherein the memory locations and the trigger memory location within the display device are included within an on-screen-display graphics buffer.

7. The method as claimed in claim 6 wherein the memory locations are included within an on-screen-display graphics buffer and the trigger memory location is included within a trigger buffer.

8. The method as claimed in claim 6 wherein the trigger packet includes a trigger bit, which when written into the trigger memory location, signals that storage of a current frame of on-screen-display graphics data is complete.

9. The method as claimed in claim 8 wherein the trigger packet also includes an overlay bit specifying whether or not the on-screen-display graphics are to be combined with video data.

10. The method as claimed in claim 6 wherein the isochronous data packets and the trigger packet are transmitted from the source device to the display device over a high speed serial interface.

11. The method as claimed in claim 10 wherein the high speed serial interface is an IEEE 1394 serial bus network.

12. The method as claimed in claim 4 further comprising:
 a. generating a subsequent screen of on-screen-display graphics to be displayed on the display device;
 b. determining changed pixels within the subsequent screen as compared to a previous screen of on-screen-display graphics;
 c. combining the on-screen-display data representing only the changed pixels into a differential stream of isochronous data packets, each differential isochronous packet including an address value corresponding to the memory location related to represented changed pixels; and
 d. transmitting the isochronous data packets from the source device to the display device over the isochronous channel.

13. A method of receiving on-screen-display graphics data, generated by a source device and transmitted in isochronous data packets over an isochronous channel to a display device, each isochronous data packet including an address value corresponding to a memory location within the display device, comprising:
 a. receiving an isochronous data packet including on-screen-display graphics data and the address value;
 b. storing the on-screen-display graphics data included within the isochronous data packet at the memory location within the display device;
 c. receiving a trigger packet including a trigger address value, corresponding to a trigger memory location within the display device, and presentation time value specifying a display time for the on-screen-display graphics; and
 d. displaying the on-screen-display graphics at the display time.

14. The method as claimed in claim 13 further comprising storing the trigger packet at the trigger memory location.

15. The method as claimed in claim 14 wherein the trigger packet includes a trigger bit, which when written into the trigger memory location, signals that storage of a current frame of on-screen-display graphics data is complete.

16. The method as claimed in claim 14 further comprising decompressing the on-screen-display graphics, if the on-screen-display graphics had previously been compressed, before the storing is completed.

17. The method as claimed in claim 14 wherein the memory locations and the trigger memory location are included within an on-screen-display graphics buffer.

18. The method as claimed in claim 17 wherein the isochronous data packets and the trigger packet are transmitted from the source device to the display device over a high speed serial interface.

19. The method as claimed in claim 18 wherein the high speed serial interface is an IEEE 1394 serial bus network.

20. An apparatus for transmitting on-screen-display graphics data from a source device to a display device comprising:
 a. a graphics source for generating on-screen-display graphics to be displayed by the display device and further wherein the graphics source also generates a trigger packet which is transmitted by the interface circuit on the occurrence of a trigger event, the trigger packet including a trigger address value corresponding to a trigger memory location within the display device; and
 b. an interface circuit coupled to the graphics source and configured for coupling to the display device for combining the on-screen-display graphics into a stream of isochronous data packets each including an address value corresponding to a memory location within the display device and transmitting the isochronous data packets from the source device to the display device over an isochronous channel.

21. The apparatus as claimed in claim 20 wherein the trigger event occurs when all isochronous data packets for a screen of on-screen-display graphics have been transmitted from the interface circuit.

22. The apparatus as claimed in claim 21 wherein the trigger packet further includes a presentation time value specifying a display time for the screen of on-screen-display graphics.

23. The apparatus as claimed in claim 22 wherein the trigger packet includes a trigger bit, which when written into the trigger memory location, signals that storage of a current frame of on-screen-display graphics data is complete.

24. The apparatus as claimed in claim 23 wherein the trigger packet also includes an overlay bit specifying whether or not the on-screen-display graphics are to be combined with video data.

25. The apparatus as claimed in claim 22 further comprising a compression circuit coupled to the graphics source and to the interface circuit for compressing the on-screen-display graphics before transmission by the interface circuit.

26. The apparatus as claimed in claim 25 wherein the interface circuit is coupled to the display device by a high speed serial interface.

27. The apparatus as claimed in claim 26 wherein the high speed serial interface is an IEEE 1394 serial bus network.

28. An apparatus for receiving on-screen-display graphics data generated by a source device and transmitted in isochronous data packets over an isochronous channel, each isochronous data packet including an address value corresponding to a memory location, comprising:
 a. an interface circuit configured for coupling to the source device for receiving the isochronous data packets from the source device over the isochronous channel;
 b. a processing device coupled to the interface circuit for receiving the isochronous data packets and separating the address value from the on-screen-display graphics data;
 c. a memory device coupled to the processing device to store the on-screen-display graphics data in a memory location corresponding to the address value; and
 d. a display device coupled to the memory device for displaying the on-screen-display graphics at a display time wherein the display time is received in a trigger packet.

29. An apparatus for receiving on-screen-display graphics data generated by a source device and transmitted in isochronous data packets over an isochronous channel, each isochronous data packet including an address value corresponding to a memory location, comprising:
 a. an interface circuit configured for coupling to the source device for receiving the isochronous data packets from the source device over the isochronous channel;
 b. a processing device coupled to the interface circuit for receiving the isochronous data packets and separating the address value from the on-screen-display graphics data, wherein the processing device is an embedded stream processor which determines if on-screen-display graphics data is included within the isochronous data packets, strips header information from the isochronous data packets, determines the address value and transmits the address value and the on-screen-display graphics data to the memory devices;

c. a memory device coupled to the processing device to store the on-screen-display graphics data in a memory location corresponding to the address value; and d. a display device coupled to the memory device for displaying the on-screen-display graphics at a display time.

30. The apparatus as claimed in claim 29 wherein the memory device includes a buffer and a DMA engine which receives the address value and stores the on-screen-display graphics data in the memory location corresponding to the address value within the buffer.

31. The apparatus as claimed in claim 30 wherein the display device includes a display and a VRAM circuit in which the on-screen-display graphics are stored before being displayed on the display.

32. The apparatus as claimed in claim 31 wherein the interface circuit is coupled to the source device by a high speed serial interface.

33. The apparatus as claimed in claim 32 wherein the high speed serial interface is an IEEE 1394 serial bus network.

34. A system for transmitting on-screen-display graphics data comprising:

a. a source device including:
  i. a graphics source for generating on-screen-display graphics to be displayed by a display device; and
  ii. a source interface circuit coupled to the graphics source and configured for coupling to the display device for combining the on-screen-display graphics into a stream of isochronous data packets each including an address value corresponding to a memory location within the display device and transmitting the isochronous data packets from the source device to the display device over an isochronous channel; and b. a display device including;
  i. a display interface circuit coupled to the source interface circuit for receiving the isochronous data packets from the source device over the isochronous channel;
  ii. a processing device coupled to the display interface circuit for receiving the isochronous data packets and separating the address value from the on-screen-display graphics data;
  iii. a memory device coupled to the processing device to store the on-screen-display graphics data in a memory location corresponding to the address value; and
  iv. a display device coupled to the memory device for displaying the on-screen-display graphics at a display time.

35. The system as claimed in claim 34 wherein the graphics source also generates a trigger packet which is transmitted by the interface circuit on the occurrence of a trigger event, the trigger packet including a trigger address value corresponding to a trigger memory location within the display device.

36. The system as claimed in claim 35 wherein the trigger event occurs when all isochronous data packets for a screen of on-screen-display graphics have been transmitted from the source interface circuit.

37. The system as claimed in claim 36 wherein the trigger packet further includes a presentation time value specifying the display time for the screen of on-screen-display graphics.

38. The system as claimed in claim 37 wherein the trigger packet includes a trigger bit, which when written into the trigger memory location, signals that storage of a current frame of on-screen-display graphics data is complete.

39. The system as claimed in claim 38 wherein the trigger packet also includes an overlay bit specifying whether or not the on-screen-display graphics are to be combined with video data.

40. The system as claimed in claim 34 wherein the processing device is an embedded stream processor which determines if on-screen-display graphics data is included within the isochronous data packets, strips header information from the isochronous data packets, determines the address value and transmits the address value and the on-screen-display graphics data to the memory device.

41. The system as claimed in claim 40 wherein the memory device includes a buffer and a DMA engine which receives the address value and stores the on-screen-display graphics data in the memory location corresponding to the address value within the buffer.

42. The system as claimed in claim 41 wherein the display device includes a display and a VRAM circuit in which the on-screen-display graphics are stored before being displayed on the display.

43. The system as claimed in claim 42 wherein the source interface circuit is coupled to the display interface circuit by a high speed serial interface.

44. The system as claimed in claim 43 wherein the high speed serial interface is an IEEE 1394 serial bus.

* * * * *

UNITED STATES PATENT AND TRADEMARK OFFICE
CERTIFICATE OF CORRECTION

| | | |
|---|---|---|
| PATENT NO. | : 7,075,557 B2 | Page 1 of 1 |
| APPLICATION NO. | : 10/430570 | |
| DATED | : July 11, 2006 | |
| INVENTOR(S) | : Harold Aaron Ludtke, Scott D. Smyers and Mark Kenneth Eyer | |

It is certified that error appears in the above-identified patent and that said Letters Patent is hereby corrected as shown below:

IN THE CLAIMS

In column 20, line 20, claim 2 replace "araphics" with - graphics -.

Signed and Sealed this

Seventeenth Day of October, 2006

JON W. DUDAS
*Director of the United States Patent and Trademark Office*